(12) United States Patent
Grestenberger et al.

(10) Patent No.: US 9,701,825 B2
(45) Date of Patent: Jul. 11, 2017

(54) STIFF POLYPROPYLENE COMPOSITION SUITABLE FOR PRIMERLESS PAINTING

(71) Applicant: Borealis AG, Vienna (AT)

(72) Inventors: Georg Grestenberger, St. Peter in der Au (AT); Claudia Kniesel, Linz (AT); Daniela Mileva, Linz (AT); Dietrich Gloger, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/891,053

(22) PCT Filed: May 15, 2014

(86) PCT No.: PCT/EP2014/059912
§ 371 (c)(1),
(2) Date: Nov. 13, 2015

(87) PCT Pub. No.: WO2014/191211
PCT Pub. Date: Dec. 4, 2014

(65) Prior Publication Data
US 2016/0108219 A1    Apr. 21, 2016

(30) Foreign Application Priority Data

May 31, 2013  (EP) .................................... 13170001

(51) Int. Cl.
*C08L 23/10*    (2006.01)

(52) U.S. Cl.
CPC ......... *C08L 23/10* (2013.01); *C08L 2205/025* (2013.01); *C08L 2205/03* (2013.01); *C08L 2207/02* (2013.01); *C08L 2308/00* (2013.01)

(58) Field of Classification Search
CPC .................. C08L 23/10; C08L 2205/03; C08L 2205/025; C08L 2207/02; C08L 2308/00
See application file for complete search history.

(56) References Cited

U.S. PATENT DOCUMENTS

2012/0108728 A1* 5/2012 Tranninger ............. C08L 23/10
524/451

FOREIGN PATENT DOCUMENTS

| EP | 0 491 566 A2 | 6/1992 |
|---|---|---|
| EP | 0 887 379 A1 | 12/1998 |
| EP | 2 410 007 A1 | 1/2012 |
| EP | 2 495 264 A1 | 9/2012 |
| EP | 2 495 280 A1 | 9/2012 |
| JP | H0971713 A | 3/1997 |
| JP | 2009046691 A | 3/2009 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2010/142540 A1 | 12/2010 |
| WO | 2012010482 A1 | 1/2012 |
| WO | 2012/117086 A1 | 9/2012 |

OTHER PUBLICATIONS

Zweifel, H., ed. "Plastics Additives Handbook", 5th Edition, 2001, pp. 871-874.
Zweifel, H., ed. "Plastics Additives Handbook", 5th Edition, 2001, pp. 956-965.
Chûjô, R., Kogure, Y., Väänänen, T. "Two-site model analysis of $^{13}$C n.m.r. of polypropylene polymerized by Ziegler-Natta catalyst with external alkoxysilane donors", POLYMER, 1994, vol. 35, No. 2, pp. 339-342.
Hayashi, T., Inoue, Y., Chûjô, R., Asakura, T. "Heptad configurational analysis of $^{13}$C n.m.r. spectra in highly isotactic polypropylene", POLYMER, 1988, vol. 29, pp. 138-143.
International Search Report for International Application No. PCT/EP2014/059912, filed May 15, 2014.

* cited by examiner

*Primary Examiner* — Robert Jones, Jr.
(74) *Attorney, Agent, or Firm* — Warn Partners, P.C.

(57) ABSTRACT

The present invention is directed to a polypropylene composition (C), an article comprising the polypropylene composition (C) as well as the use of the polypropylene composition (C) to reduce paintability failure of a molded article.

17 Claims, 1 Drawing Sheet

STIFF POLYPROPYLENE COMPOSITION SUITABLE FOR PRIMERLESS PAINTING

CROSS REFERENCE TO RELATED APPLICATIONS

This application is a National Stage of International Application No. PCT/EP2014/059912, filed May 15, 2014. This application claims priority to European Patent Application No. 13170001.5 filed on May 31, 2013. The disclosures of the above applications are incorporated herein by reference.

The present invention is directed to a polypropylene composition (C), an article comprising the polypropylene composition (C) as well as the use of the polypropylene composition (C) to reduce paintability failure of a molded article.

Polypropylene is the material of choice in many applications as it can be tailored to specific purposes needed. For instance, heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a plastomer; like a linear low density polyethylene (LLDPE), or a propylene copolymer rubber, like an ethylene propylene rubber (EPR) or an ethylene propylene diene monomer polymer (EPDM). In the case of propylene copolymer rubber the heterophasic polypropylene may contain additionally a crystalline polyethylene to some extent.

In the automotive industry such heterophasic polypropylene grades contain an amount of about 30 wt.-% amorphous phase, which normally is produced directly in one or two gas phase reactors or added externally to the matrix via a compounding step. These materials are normally used in combination with 10 to 20 wt.-% filler, like talcum, which overall leads to materials offering a good balance of stiffness and impact strength. Due to its non-polar nature, such polypropylene grades are poor in paint adhesion and thus the abrasion rate is undesirably high. In order to improve the paint adhesion of such materials primers and surface treatment are typically applied. However, due to environmental reasons it is desired to reduce the use of primers to a minimum or to avoid the use of primers at all.

Thus, the object of the present invention is to provide a material which enables a skilled person to produce molded articles having a good stiffness/impact balance and high paint adhesion even without the use of primers.

The finding of the present invention is to provide a polypropylene composition (C) having a defined combination of a heterophasic propylene copolymer (HPP), a polypropylene homopolymer (PP-H) and a mineral filler (F).

Accordingly the present invention is directed to a polypropylene composition (C), the polypropylene composition (C) comprising
(a) 20.0 to 60.0 wt.-%, based on the total weight of the composition, of a heterophasic propylene copolymer (HPP) having a melt flow rate $MFR_2$ (230° C.) measured according to ISO 1133 in the range of 10.0 to 40.0 g/10 min, comprising
   (a1) a polypropylene matrix (M), and
   (a2) an elastomeric propylene copolymer (E1)
(b) 5.0 to 70.0 wt.-%, based on the total weight of the composition, of a polypropylene homopolymer (PP-H1), and
(c) 20.0 to 40.0 wt.-%, based on the total weight of the composition, of a mineral filler (F) being selected from the group consisting of talcum, wollastonite, caolin and mica,
wherein the polypropylene composition (C) has a melt flow rate $MFR_2$ (230° C.) measured according to ISO 1133 in the range of 10.0 to 25.0 g/10 min.

According to one embodiment of the present invention, the polypropylene composition (C) comprises
(a) 30.0 to 60.0 wt.-%, based on the total weight of the composition, of the heterophasic propylene copolymer (HPP),
and/or
(b) 5.0 to 30.0 wt.-%, based on the total weight of the composition, of the polypropylene homopolymer (PP-H1),
and/or
(c) 25.0 to 35.0 wt.-%, based on the total weight of the composition, of the mineral filler (F).

According to another embodiment of the present invention, the polypropylene composition (C) has
(a) a tensile modulus in the range from 2800 to 4500 MPa,
and/or
(b) a Charpy notched impact strength at +23° C. of ≥4 $kJ/m^2$,
and/or
(c) a Coefficient of Linear Thermal Expansion (CLTE) −30/+80° C. of ≤45 μm/mK.

According to yet another embodiment of the present invention, the heterophasic propylene copolymer (HPP) has
(a) a melt flow rate $MFR_2$ (230° C.) measured according to ISO 1133 in the range of 10.0 to 25.0 g/10 min,
and/or
(b) an intrinsic viscosity (IV) in the range of 1.8 to 4.0 dl/g, measured as the intrinsic viscosity (IV) of the xylene cold soluble (XCS) fraction of the heterophasic propylene copolymer (HPP);
and/or
(c) a comonomer content of 25.0 to 50.0 wt.-%, based on the total weight of the xylene cold soluble fraction of the heterophasic propylene copolymer (HPP), wherein the comonomers preferably are ethylene and/or a $C_4$ to $C_{12}$ olefin.

According to one embodiment of the present invention, the polypropylene matrix (M) of the heterophasic propylene copolymer (HPP)
(a) is a propylene homopolymer (PP-H2) or a random propylene copolymer (PP-C) with comonomers selected from ethylene and/or $C_4$ to $C_{12}$ α-olefins,
and/or
(b) has a melt flow rate $MFR_2$ (230° C.) measured according to ISO 1133 in the range of 30.0 to 300.0 g/10 min,
and/or
(c) has a xylene cold soluble (XCS) content no higher than 5.0 wt.-%.

According to another embodiment of the present invention, the elastomeric propylene copolymer (E1) of the heterophasic propylene copolymer (HPP) has
(a) an intrinsic viscosity (IV) in the range of 1.8 to 4.0 di/g, measured as the intrinsic viscosity (IV) of the xylene cold soluble (XCS) fraction of the heterophasic propylene copolymer (HPP);
and/or
(b) a comonomer content of 25.0 to 50.0 wt.-%, based on the total weight of the xylene cold soluble fraction of the heterophasic propylene copolymer (HPP), wherein the comonomers preferably are ethylene and/or a $C_4$ to $C_{12}$ olefin.

According to yet another embodiment of the present invention, the polypropylene homopolymer (PP-H1) has a melt flow rate $MFR_2$ (230° C.) measured according to ISO 1133 in the range of 70.0 to 150.0 g/10 min.

According to one embodiment of the present invention, wherein the mineral filler (F) is talc, preferably the talc has an average particle size d50 in the range of 0.5 to 20.0 μm.

According to another embodiment of the present invention, the polypropylene composition (C) comprises 5.0 to 15.0 wt.-%, based on the total weight of the composition, of an elastomeric copolymer (E2) comprising units derived from ethylene and $C_3$ to $C_8$ α-olefins.

According to yet another embodiment of the present invention, the polypropylene composition (C) comprises the heterophasic propylene copolymer (HPP) and the polypropylene homopolymer (PP-H1) in an amount of below 65.0 wt.-%, based on the total weight of the composition.

According to one embodiment of the present invention, the elastomeric copolymer (E2) has
(a) a density of equal or less than 935 kg/m³, and/or
(b) a melt flow rate $MFR_2$ (190° C.) measured according to ISO 1133 in the range of 0.5 to 30.0 g/10 min.

According to another embodiment of the present invention,
(a) the weight ratio of heterophasic propylene copolymer (HPP) to the polypropylene homopolymer (PP-H1) [HPP/PP-H1] is from 12.0:1.0 to 1.0:1.0, and/or
(b) the weight ratio of heterophasic propylene copolymer (HPP) to the mineral filler (F) [HPP/F] is from 3.0:1.0 to 1.0:1.0, and/or
(c) the weight ratio of heterophasic propylene copolymer (HPP) and polypropylene homopolymer (PP-H1) to the mineral filler (F) [HPP+PP-H1/F] is below 4.0. and/or
(d) the weight ratio of heterophasic propylene copolymer (HPP) to the elastomeric copolymer (E2) [HPP/E2] is below 8.0.

The present invention also relates to an article comprising the polypropylene composition (C).

It is preferred that the article is an automotive article, preferably an exterior or interior automotive article selected from bumpers, body panels, rocker panels, side trims, step assists, spoilers and dash boards.

A further aspect of the present invention is the use of the above polypropylene composition (C) to reduce paintability failure of a molded article, preferably to reduce paintability failure of an injection molded article, such as automotive articles. It is preferred to keep the paintability failure of automotive articles, such as exterior or interior automotive articles, equal or below 15% and preferably equal or below 12%.

In the following the invention will be described in more detail.

Polypropylene Composition (C)

It is one requirement of the present invention that the polypropylene composition (C) comprises
(a) 20.0 to 60.0 wt.-%, based on the total weight of the composition, of a heterophasic propylene copolymer (HPP) having a melt flow rate $MFR_2$ (230° C.) measured according to ISO 1133 in the range of 10.0 to 40.0 g/10 min, comprising
  (a1) a polypropylene matrix (M), and
  (a2) an elastomeric propylene copolymer (E1)
(b) 5.0 to 70.0 wt.-%, based on the total weight of the composition, of a polypropylene homopolymer (PP-H1), and
(c) 20.0 to 40.0 wt.-%, based on the total weight of the composition, of a mineral filler (F) being selected from the group consisting of talcum, wollastonite, caolin and mica, wherein the polypropylene composition (C) has a melt flow rate $MFR_2$ (230° C.) measured according to ISO 1133 in the range of 10.0 to 25.0 g/10 min.

It is apparent from the wording used for the different polymers (HPP, PP-H1 and the optional E2) according to the present invention that they must (chemically) differ from each other. The expression "heterophasic" indicates that the matrix contains (finely) dispersed inclusions being not part of the matrix and said inclusions contain the elastomeric propylene copolymer (E1). The term "inclusion" according to this invention shall preferably indicate that the matrix and the inclusion form different phases within the heterophasic propylene copolymer, said inclusions are for instance visible by high resolution microscopy, like electron microscopy or scanning force microscopy. The final polypropylene composition (C) comprising the polypropylene matrix (M) and the elastomeric propylene copolymer (E1) as part of the heterophasic propylene copolymer (HPP), the polypropylene homopolymer (PP-H1) and the optional elastomeric copolymer (E2) is probably of a complex structure. Probably, the polypropylene matrix (M) of the heterophasic propylene copolymer (HPP) and the polypropylene homopolymer (PP-H1) form together a continuous phase being the matrix of the polypropylene composition (C), wherein the elastomeric propylene copolymer (E1) and optionally the optional elastomeric copolymer (E2) form together or individually inclusions dispersed therein.

Additionally the inclusions of the final polypropylene composition (C) may also contain the mineral filler (F); however preferably the mineral filler (F) forms separate inclusions within the polypropylene matrix (M).

In a preferred embodiment of the present invention, the polypropylene composition (C) comprises
(a) 30.0 to 60.0 wt.-%, based on the total weight of the composition, of the heterophasic propylene copolymer (HPP), and/or
(b) 5.0 to 30.0 wt.-%, based on the total weight of the composition, of the polypropylene homopolymer (PP-H1), and/or
(c) 25.0 to 35.0 wt.-%, based on the total weight of the composition, of the mineral filler (F).

For example, the polypropylene composition (C) comprises
(a) 30.0 to 60.0 wt.-%, based on the total weight of the composition, of the heterophasic propylene copolymer (HPP), and
(b) 5.0 to 30.0 wt.-%, based on the total weight of the composition, of the polypropylene homopolymer (PP-H1), and
(c) 25.0 to 35.0 wt.-%, based on the total weight of the composition, of the mineral filler (F).

Typically the polypropylene composition (C) has a rather low melt flow rate. It is thus desired that the polypropylene composition (C) has a melt flow rate $MFR_2$ (230° C.)

measured according to ISO 1133 in the range of 10.0 to 25.0 g/10 min. More specifically, the polypropylene composition (C) has a melt flow rate $MFR_2$ (230° C.) measured according to ISO 1133 in the range of 10.0 to 20.0 g/10 min.

It is further preferred that the polypropylene composition (C) has a good stiffness/impact balance. It is thus preferred that the polypropylene composition (C) shows good impact behavior. Accordingly it is appreciated that the polypropylene composition (C) has Charpy notched impact strength at +23° C. of at least 4 $kJ/m^2$, more preferably in the range of 4 to 70 $kJ/m^2$, still more preferably in the range of 4 to 50 $kJ/m^2$ and most preferably in the range of 4 to 20 $kJ/m^2$.

Additionally or alternatively, the flexural modulus of the polypropylene composition (C) should be rather high. It is preferred that the flexural modulus of the polypropylene composition (C) is in the range from 2800 to 4500 MPa, more preferably in the range of 3000 to 4250 MPa, even more preferably of 3000 to 4000 MPa, still more preferably in the range of 3000 to 3800 MPa.

It is further appreciated that the polypropylene composition (C) has a Coefficient of Linear Thermal Expansion (CLTE) −30/+80° C. of ≤45 µm/mK. For example, the polypropylene composition (C) has a Coefficient of Linear Thermal Expansion (CLTE) −30/+80° C. in the range from 10 to 45 µm/mK, more preferably in the range from 20 to 45 µm/mK and most preferably in the range from 25 to 45 urn/mK.

In the following the individual components of the polypropylene composition (C) are described in more detail.

Heterophasic Propylene Copolymer (HPP)

It is one requirements of the present invention that the polypropylene composition (C) comprises the heterophasic propylene copolymer (HPP) in an amount from 20.0 to 60.0 wt.-%, based on the total weight of the composition.

In one embodiment of the present invention, the polypropylene composition (C) comprises the heterophasic propylene copolymer (HPP) in an amount from 30 to 60 wt.-%, based on the total weight of the composition.

For example, the polypropylene composition (C) comprises the heterophasic propylene copolymer (HPP) in an amount from 30.0 to 50.0 wt.-%, preferably from 35.0 to 45.0 wt.-%, based on the total weight of the composition. This is preferably the case if the polypropylene composition (C) further comprises an elastomeric copolymer (E2).

Alternatively, the polypropylene composition (C) comprises the heterophasic propylene copolymer (HPP) in an amount from 40.0 to 60.0 wt.-%, more preferably from 45.0 to 60.0 wt.-%, based on the total weight of the composition. The foregoing is preferably applicable in case the polypropylene composition (C) is free of an elastomeric copolymer (E2).

It is preferred that the heterophasic propylene copolymer (HPP) before being mixed with the other components mentioned herein comprises as polymer components only the polypropylene matrix (M) and the elastomeric propylene copolymer (E1). In other words the heterophasic propylene copolymer (HPP) may contain further additives but no other polymer in an amount exceeding 7.5 wt.-%, more preferably exceeding 5.0 wt.-%, based on the total weight of the heterophasic propylene copolymer (HPP), more preferably based on the polymers present in the heterophasic propylene copolymer (HPP). One additional polymer which may be present in such low amounts is a polyethylene which is a reaction product obtained by the preparation of the heterophasic propylene copolymer (HPP). Accordingly, it is in particular appreciated that a heterophasic propylene copolymer (HPP) as defined in the instant invention contains only a polypropylene matrix (M), the elastomeric propylene copolymer (E1) and optionally a polyethylene in amounts as mentioned in this paragraph.

The heterophasic propylene copolymer (HPP) according to this invention preferably comprises
(a) a polypropylene matrix (M) and
(b) an elastomeric propylene copolymer (E1) comprising units derived from
propylene and
ethylene and/or $C_4$ to $C_{12}$ α-olefin.

Preferably the propylene content in the heterophasic propylene copolymer (HPP) is 70.0 to 92.0 wt.-%, more preferably 75.0 to 90.0 wt.-%, based on the total weight of the heterophasic propylene copolymer (HPP), more preferably based on the amount of the polymer components of the heterophasic propylene copolymer (HPP), yet more preferably based on the amount of the polypropylene matrix (M) and the elastomeric propylene copolymer (E1) together. The remaining part constitutes the comonomers, preferably ethylene.

Accordingly, the polypropylene matrix (M) content, i.e. the xylene cold insoluble (XCI) content, in the heterophasic propylene copolymer (HPP) is preferably in the range of 50.0 to 75.0 wt.-%, more preferably in the range of 60.0 to 75.0 wt.-%. In case polyethylene is present in the heterophasic propylene copolymer (HPP), the values for the polypropylene matrix (M) content but not for the xylene cold insoluble (XCI) content may be a bit decreased.

On the other hand the elastomeric propylene copolymer (E1) content, i.e. the xylene cold soluble (XCS) content, in the heterophasic propylene copolymer (HPP) is preferably in the range of 25.0 to 50.0 wt.-%, more preferably in the range of 25.0 to 40.0 wt.-%.

It is one requirement of the present invention that the heterophasic propylene copolymer (HPP) has a melt flow rate $MFR_2$ (230° C.) measured according to ISO 1133 in the range of 10.0 to 40.0 g/10 min, preferably in the range of 10.0 to 35.0 g/10 min, still more preferably in the range of 10.0 to 25.0 g/10 min, yet more preferably in the range of 10.0 to 15.0 g/10 min.

The polypropylene matrix (M) of the heterophasic propylene copolymer (HPP) can be a propylene homopolymer (PP-H) or a random propylene copolymer (PP-C) with comonomers selected from ethylene and/or $C_4$ to $C_{12}$ α-olefins. Preferably, the polypropylene matrix (M) of the heterophasic propylene copolymer (HPP) is a propylene homopolymer (PP-H2). Accordingly the xylene cold insoluble (XCI) fraction of the heterophasic propylene copolymer (HPP) represents the matrix (M) being a propylene homopolymer and optionally the polyethylene whereas the xylene cold soluble (XCS) fraction represents the elastomeric part of the heterophasic propylene copolymer (HPP), i.e. the elastomeric propylene copolymer (E1).

The expression propylene homopolymer (PP-H2) used in the instant invention relates to a polypropylene that consists substantially, i.e. of more than 99.7 wt.-%, still more preferably of at least 99.8 wt.-%, of propylene units. In a preferred embodiment only propylene units in the propylene homopolymer (PP-H2) are detectable.

Accordingly the comonomer content of the polypropylene matrix (M) is preferably equal or below 1.0 wt.-%, more preferably not more than 0.8 wt.-%, still more preferably not more than 0.5 wt.-%, like not more than 0.2 wt.-%, e.g. non detectable.

As mentioned above the polypropylene matrix (M) is preferably a propylene homopolymer (PP-H2).

In case the polypropylene matrix (M) is a random propylene copolymer (PP-C) it is appreciated that the random propylene copolymer (PP-C) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably, the random propylene copolymer (PP-C) according to this invention comprises, especially consists of, monomers copolymerizable with propylene from the group consisting of ethylene, 1-butene and 1-hexene. More specifically, the random propylene copolymer (PP-C) of this invention comprises—apart from propylene—units derivable from ethylene and/or 1-butene. In a preferred embodiment the random propylene copolymer (PP-C) comprises units derivable from ethylene and propylene only.

Additionally, it is appreciated that the random propylene copolymer (PP-C) has preferably a comonomer content in the range of more than 0.3 to 3.0 wt.-%, more preferably in the range of more than 0.3 to 2.5 wt.-%, yet more preferably in the range of more than 0.3 to 2.0 wt.-%, based on the total weight of the random propylene copolymer (PP-C).

The term "random" indicates that the comonomers of the random propylene copolymer (PP-C) are randomly distributed within the propylene copolymer. The term random is understood according to IUPAC (Glossary of basic terms in polymer science; IUPAC recommendations 1996).

Further it is appreciated that the polypropylene matrix (M) of the heterophasic propylene copolymer (HPP) has a moderate melt flow $MFR_2$ (230° C.). As stated above the xylene cold insoluble (XCI) fraction of a heterophasic propylene copolymer (HPP) is essentially identical with the matrix of said heterophasic propylene copolymer (HPP). Accordingly, the melt flow rate $MFR_2$ (230° C.) of the polypropylene matrix (M) equates with the melt flow rate $MFR_2$ (230° C.) of the xylene cold insoluble (XCI) fraction of the heterophasic propylene copolymer (HPP). Accordingly, it is preferred that the polypropylene matrix (M) and/or the xylene cold insoluble (XCI) fraction of the heterophasic propylene copolymer (HPP) has a melt flow rate $MFR_2$ (230° C.) measured according to ISO 1133 in the range of 30.0 to 300.0 g/10 min, more preferably 40.0 to 250.0 g/10 min, still more preferably 45.0 to 200.0 g/10 min.

In one embodiment of the present invention, the polypropylene matrix (M) or the xylene cold insoluble (XCI) fraction of the heterophasic propylene copolymer (HPP) has a melt flow rate $MFR_2$ (230° C.) measured according to ISO 1133 in the range of 30.0 to 300.0 g/10 min, more preferably 40.0 to 250.0 g/10 min, still more preferably 45.0 to 200.0 g/10 min. Preferably, the polypropylene matrix (M) and the xylene cold insoluble (XCI) fraction of the heterophasic propylene copolymer (HPP) have a melt flow rate $MFR_2$ (230° C.) measured according to ISO 1133 in the range of 30.0 to 300.0 g/10 min, more preferably 40.0 to 250.0 g/10 min, still more preferably 45.0 to 200.0 g/10 min.

Preferably, the xylene cold soluble content of the polypropylene matrix (M) of the heterophasic propylene copolymer (HPP) is no higher than 5.0 wt.-%, more preferable no higher than 4.0 wt.-%, still more preferably no higher than 3.0 wt.-%, based on the total weight of the polypropylene matrix (M). Still more preferably the xylene cold soluble content of the polypropylene matrix (M) being a propylene homopolymer of the heterophasic propylene copolymer (HPP) is no higher than 2.5 wt.-%, more preferable no higher than 2 wt.-%, still more preferably no higher than 1.5 wt.-%, based on the total weight of the polypropylene matrix (M).

Preferably, the polypropylene matrix (M) is isotactic. Accordingly, it is appreciated that the polypropylene matrix (M) has a rather high pentad concentration, i.e. higher than 80%, more preferably higher than 85%, yet more preferably higher than 90%, still more preferably higher than 92%, still yet more preferably higher than 93%, like higher than 95%.

One further essential component of the heterophasic propylene copolymer (HPP) is the elastomeric propylene copolymer (E1).

The elastomeric propylene copolymer (E1) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (E1) may additionally contain units derived from a conjugated diene, like butadiene, or a non-conjugated diene, however, it is preferred that the elastomeric propylene copolymer (E1) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane. Multi-ring alicyclic fused and bridged ring dienes are also suitable including tetrahydroindene, methyltetrahydroindene, dicyclopentadiene, bicyclo(2,2,1)hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly, the elastomeric propylene copolymer (E1) comprises at least units derivable from propylene and ethylene and may comprise other units derivable from a further α-olefin as defined in the previous paragraph. However, it is in particular preferred that the elastomeric propylene copolymer (E1) comprises units only derivable from propylene and ethylene and optionally a conjugated diene, like butadiene, or a non-conjugated diene as defined in the previous paragraph, like 1,4-hexadiene. Thus, an ethylene propylene non-conjugated diene monomer polymer (EPDM1) and/or an ethylene propylene rubber (EPR1) as elastomeric propylene copolymer (E1) is especially preferred, the latter most preferred.

In the present invention the content of units derivable from propylene in the elastomeric propylene copolymer (E1) equates with the content of propylene detectable in the xylene cold soluble (XCS) fraction. Accordingly, the propylene detectable in the xylene cold soluble (XCS) fraction ranges from 50.0 to 75.0 wt.-%, more preferably 60.0 to 75.0 wt.-%.

Thus in a specific embodiment the elastomeric propylene copolymer (E1), i.e. the xylene cold soluble (XCS) fraction, comprises from 25.0 to 50.0 wt.-%, more preferably from 25.0 to 45.0 wt.-%, units derivable from comonomers other than propylene, like ethylene. Preferably the elastomeric propylene copolymer (E1) is an ethylene propylene non-conjugated diene monomer polymer (EPDM1) or an ethylene propylene rubber (EPR1), the latter especially preferred, with a propylene and/or ethylene content as defined in this paragraph.

In one embodiment of the present invention, the intrinsic viscosity (IV) of the xylene cold soluble (XCS) fraction of the heterophasic propylene copolymer (HPP) is rather high. Rather high values of intrinsic viscosity (IV) improve the impact strength. Accordingly, it is appreciated that the intrinsic viscosity of the xylene cold soluble (XCS) fraction of the heterophasic propylene copolymer (HPP) is above 1.8 dl/g, more preferably at least 2.0 dl/g. On the other hand the intrinsic viscosity (IV) should be not too high otherwise the flowability is decreased. Thus the intrinsic viscosity of the xylene cold soluble (XCS) fraction of the heterophasic propylene copolymer (HPP) is preferably in the range of 1.8 to 4.0 dl/g, more preferably in the range 2.0 to 3.5 dl/g.

Preferably, it is desired that the heterophasic propylene copolymer (HPP) shows good impact behavior. Accordingly, it is appreciated that the heterophasic propylene copolymer (HPP) has Charpy notched impact strength at −20° C. of at least 5 kJ/m$^2$, more preferably in the range of 5 to 15 kJ/m$^2$, still more preferably in the range of 6 to 12 kJ/m$^2$.

Further, also the flexural modulus of the heterophasic propylene copolymer (HPP) should be rather high. It is preferred that the flexural modulus of the heterophasic propylene copolymer (HPP) is at least 700 MPa, more preferably in the range of 700 to 1500 MPa, even more preferably of 800 to 1300 MPa, still more preferably in the range of 900 to 1200 MPa.

Preferably the heterophasic propylene copolymer (LIPP) is α-nucleated. Even more preferred the present invention is free of β-nucleating agents. Accordingly, the α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel, pages 871 to 873.

Preferably the heterophasic polypropylene composition (HPP) contains up to 5 wt.-% of the α-nucleating agent. In a preferred embodiment, the heterophasic polypropylene composition (HPP) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the heterophasic polypropylene composition (HPP) contains a vinylcycloalkane, like vinylcyclohexane (VCH), polymer and/or vinylalkane polymer. In one specific embodiment the heterophasic polypropylene composition (HECO1) contains a vinylcycloalkane, like vinylcyclohexane (VCH), polymer and/or vinylalkane polymer. Preferably the vinylcycloalkane is vinylcyclohexane (VCH) polymer is introduced into the heterophasic polypropylene composition (HPP) by the BNT technology.

The instant heterophasic polypropylene composition (HPP) is preferably obtained by a specific process. Accordingly the heterophasic polypropylene composition (HPP) is preferably obtained by a sequential polymerization process in the first reactor ($1^{st}$ R) and optionally in a second reactor ($2^{nd}$ R) the propylene homopolymer (PP-H2) is produced, whereas in the third reactor ($3^{rd}$ R) the elastomeric propylene copolymer (E1) of the heterophasic propylene copolymer (HPP) is obtained.

The term "sequential polymerization process" indicates that the heterophasic polypropylene composition (HPP) is produced in at least two reactors, preferably in three reactors or more, like four reactors, connected in series. Accordingly the present process comprises at least a first reactor ($1^{st}$ R), a second reactor ($2^{nd}$ R), a third reactor ($3^{rd}$ R) and an optional fourth reactor ($4^{th}$ R). The term "polymerization reactor" shall indicate that the main polymerization takes place. Thus, in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

After the first reactor ($1^{st}$ R) and second reactor ($2^{nd}$ R) the matrix (M), i.e. the propylene homopolymer (PP-H2), of the heterophasic propylene copolymer (HPP), is obtained. This matrix (M) is subsequently transferred into the third reactor ($3^{rd}$ R) and optional fourth reactor ($4^{th}$ R) in which the elastomeric propylene copolymer (E1) is produced and thus the heterophasic propylene copolymer (HPP) of the instant invention is obtained.

Preferably the weight ratio between the matrix (M), i.e. the propylene homopolymer (PP-H2), and the elastomeric propylene copolymer (E1) [(M)/(E1)] is 85/15 to 60/40, more preferably 83/17 to below 62/38.

The first reactor ($1^{st}$ R) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (2nd ($3^{rd}$ R), the third reactor R) and the optional fourth reactor ($4^{th}$ R) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first reactor ($1^{st}$ R) is a slurry reactor (SR), like loop reactor (LR), whereas the second reactor ($2^{nd}$ R), the third reactor ($3^{rd}$ R) and the optional fourth reactor ($4^{th}$ R) are gas phase reactors (GPR). Accordingly for the instant process at least two, preferably two or three or four polymerization reactors, namely a slurry reactor (SR), like loop reactor (LR), a first gas phase reactor (GPR-1), a second gas phase reactor (GPR-2) and optionally a third gas phase reactor (GPR-3) connected in series are used. If needed prior to the slurry reactor (SR) a prepolymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HPP), as defined above the conditions for the first reactor ($1^{st}$ R), i.e. the slurry reactor (SR), like a loop reactor (LR), may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from the first reactor ($1^{st}$ R) is transferred to the second reactor ($2^{nd}$ R), i.e. gas phase reactor (GPR-1), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor ($3^{rd}$ R) and optional fourth reactor ($4^{th}$ R), preferably in the second gas phase reactor (GPR-2) and optionally in the third gas phase reactor (GPR-3), is similar to the second reactor ($2^{nd}$ R).

The residence time can vary in the three reactor zones.

In one embodiment of the process for producing the heterophasic propylene copolymer (HPP), the residence time in the first reactor ($1^{st}$ R), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor ($1^{st}$ R), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HPP), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIc) or (Mb), preferably represented by formula (IIIa).

The process runs especially efficient by using a Ziegler-Natta catalyst system, preferably by using a Ziegler-Natta catalyst system as defined here in detail below, and a specific comonomer/propylene ratio in the second reactor ($2^{nd}$ R) and/or in the third reactor ($3^{rd}$ R) and/or in the optional fourth reactor ($4^{th}$ R), respectively. Accordingly, it is preferred that (a) the comonomer/propylene ratio [Co/C3], like the ethylene/propylene ratio [C2/C3], in the second reactor ($2^{nd}$ R) is preferably in the range of 10 to 65 mol/kmol, more preferably in the range of 20 to 60 mol/kmol, and/or (c) the comonomer/propylene ratio [Co/C3], like the ethylene/propylene ratio [C2/C3], in the third reactor ($3^{rd}$ R) is in the range of above 400 to 700 mol/kmol, more preferably in the range of 500 to 600 mol/kmol.

In the following the used catalyst is defined in more detail.

Preferably component (i) is a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional TiCl$_4$.

The procatalyst is produced as defined for example in the patent applications WO 87/07620, WO 92/19653, WO 92/19658 and EP 0 491 566. The content of these documents is herein included by reference.

First an adduct of MgCl$_2$ and a C$_1$-C$_2$ alcohol of the formula MgCl$_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl, and n is 1 to 6, is contacting with TiCl$_4$ to form a titanised carrier, followed by the steps of adding to said titanised carrier
(i) a dialkylphthalate of formula (I) with R" and R$^{2'}$ being independently at least a C$_5$-alkyl, like at least a C$_8$-alkyl,
or preferably
(ii) a dialkylphthalate of formula (I) with R" and R$^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

(II)

with R$^1$ and R$^2$ being methyl or ethyl, preferably ethyl, the dialkylphthalat of formula (II) being the internal donor and recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4.0 to 12.0 wt.-% and more preferably between 6.0 and 10.0 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HPP) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIc) or (IIIb). Formula (IIIa) is defined by $$\text{Si(OCH}_3\text{)}_2\text{R}_2^5 \tag{IIIa}$$

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$\text{Si(OCH}_2\text{CH}_3\text{)}_3(\text{NR}^x\text{R}^y) \tag{IIIb}$$

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor of formula (Iamb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$], diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

CH$_2$=CH—CHR$^3$R$^4$ wherein R$^3$ and R$^4$ together form a 5- or 6-membered saturated, unsaturated or aromatic ring or independently represent an alkyl group comprising 1 to 4 carbon atoms. The so modified catalyst is used for the preparation of the heterophasic propylene copolymer (HPP), according to this invention (BNT technology).

The additives as stated above are added to the heterophasic propylene copolymer (HPP) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets.

Polypropylene Homopolymer (PP-H1)

One further essential component of the instant polypropylene composition (C) is a polypropylene homopolymer (PP-H1).

It is appreciated that the polypropylene composition (C) comprises the polypropylene homopolymer (PP-H1) in an amount from 5.0 to 70.0 wt.-%, based on the total weight of the composition.

In one embodiment of the present invention, the polypropylene composition (C) comprises the polypropylene homopolymer (PP-H1) in an amount from 5.0 to 30.0 wt.-%, based on the total weight of the composition.

For example, the polypropylene composition (C) comprises the polypropylene homopolymer (PP-H1) in an amount from 10.0 to 30.0 wt.-%, preferably from 15.0 to 25.0 wt.-%, based on the total weight of the composition. This is preferably the case if the polypropylene composition (C) further comprises an elastomeric copolymer (E2).

Alternatively, the polypropylene composition (C) comprises the polypropylene homopolymer (PP-H1) in an amount from 5.0 to 25.0 wt.-%, more preferably from 5.0 to 20.0 wt.-%, based on the total weight of the composition. The foregoing is preferably applicable in case the polypropylene composition (C) is free of an elastomeric copolymer (E2).

The polypropylene homopolymer (PP-H1) preferably has a melt flow rate MFR$_2$ (230° C.) measured according to ISO 1133 in the range of 70.0 to 150.0 g/10 min, preferably in the range of 80.0 to 150.0 g/10 min, more preferably in the range of 90.0 to 150.0 g/10 min, still more preferably in the range of 90.0 to 140.0 g/10 min, like in the range of 100.0 to 140.0 g/10 min.

It is appreciated that the polypropylene matrix (M) of the heterophasic propylene copolymer (HPP) being a propylene homopolymer (PP-H2) and the polypropylene homopolymer (PP-H1) according to the present invention (chemically) differ from each other. Preferably, the polypropylene matrix (M) of the heterophasic propylene copolymer (HPP) being a propylene homopolymer (PP-H2) and the polypropylene homopolymer (PP-H1) differ in the melt flow rate MFR$_2$ (230° C.). Accordingly, it is appreciated that the polypropylene matrix (M) of the heterophasic propylene copolymer (HPP) being a propylene homopolymer (PP-H2) differs by a melt flow rate MFR$_2$ (230° C.) of at least 25.0 g/10 min, more preferably by at least 50.0 g/10 min, still more preferably in a range from 25.0 to 150.0 g/10 min, yet more preferably in a range from 50.0 to 100.0 g/10 min, from the polypropylene homopolymer (PP-H1). Preferably, the melt flow rate MFR$_2$ (230° C.) of the polypropylene matrix (M) of the heterophasic propylene copolymer (HPP) being a propylene homopolymer (PP-H2) is lower than the melt flow rate MFR$_2$ (230° C.) of the polypropylene homopolymer (PP-H1).

Additionally or alternatively, the polypropylene matrix (M) of the heterophasic propylene copolymer (HPP) being a propylene homopolymer (PP-H2) and the polypropylene homopolymer (PP-H1) fulfills the equation (I), more preferably equation (Ia), still more preferably equation (Ib), $$\frac{MFR(PP-H1)}{MFR(PP-H2)} \geq 1.1 \tag{I}$$

$$1.1 \leq \frac{MFR(PP-H1)}{MFR(PP-H2)} \leq 3.0 \tag{Ia}$$

$$1.5 \leq \frac{MFR(PP-H1)}{MFR(PP-H2)} \leq 2.60 \tag{Ib}$$

wherein

MFR (PP-H1) is the melt flow rate MFR$_2$ (230° C.) [g/10 min] of the polypropylene homopolymer (PP-H1), MFR (PP-H2) is the melt flow rate MFR$_2$ (230° C.) [g/10 min] of the polypropylene matrix (M) of the heterophasic propylene copolymer (HPP) being a propylene homopolymer (PP-H2).

The expression polypropylene homopolymer (PP-H1) used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the polypropylene homopolymer (PP-H1) are detectable.

It is appreciated that the polypropylene homopolymer (PP-H1) has Charpy notched impact strength at 23° C. of equal or below 10 kJ/m$^2$, more preferably in the range of 0.5 to 10 kJ/m$^2$, still more preferably in the range of 0.5 to 5 kJ/m$^2$.

Furthermore, to increase the stiffness of the final polypropylene composition (C), the flexural modulus of the polypropylene homopolymer (PP-H1) should be rather high. It is preferred that the flexural modulus of the polypropylene homopolymer (PP-H1) is at least 900 MPa, more preferably in the range of 900 to 2200 MPa, even more preferably of 1000 to 2000 MPa, still more preferably in the range of 1200 to 1800 MPa.

It is preferred that the polypropylene homopolymer (PP-H1) is present in a specific weight ratio compared to the heterophasic propylene copolymer (HPP) and/or the mineral filler (F) in the polypropylene composition (C).

For example, the weight ratio of heterophasic propylene copolymer (HPP) to the polypropylene homopolymer (PP-H1) [HPP/PP-H1] is from 12.0:1.0 to 1.0:1.0. Preferably, the heterophasic propylene copolymer (HPP) to the polypropylene homopolymer (PP-H1) [HPP/PP-H1] is from 11.0:1.0 to 1.0:1.0 and more preferably from 10.0:1.0 to 1.0:1.0.

Additionally or alternatively, the weight ratio of polypropylene homopolymer (PP-H1) to the mineral filler (F) [PP-H1/F] is from 1.0:1.0 to 1.0:8.0. Preferably, the weight ratio of polypropylene homopolymer (PP-H1) to the mineral filler (F) [PP-H1/F] is from 1.0:1.0 to 1.0:6.0, and more preferably from 1.0:1.0 to 1.0:5.0.

Concerning the preparation of the polypropylene homopolymer (PP-H1), it is referred to the explanations provided above with regard to the polypropylene matrix (M), i.e. the polypropylene homopolymer (PP-H2), of the heterophasic propylene copolymer (HPP).

Mineral Filler (F)

In addition to the polymer components the polymer composition according to the present invention comprises a mineral filler (F) in an amount in the range of 20.0 to 40.0 wt.-% and preferably in the range of 25.0 to 35.0 wt.-%, based on the total weight of the composition. It is one further requirement of the present invention that the mineral filler (F) is selected from the group consisting of talcum, wollastonite, caolin and mica.

In one embodiment of the present invention, the mineral filler (F) is talc.

The mineral filler (F) preferably has an average particle size d50 in the range of 0.5 to 20.0 µm, more preferably in the range of 0.5 to 15.0 µm, still more preferably in the range of 0.75 to 10.0 µm.

Typically, the mineral filler (F) has a cutoff particle size d95 [mass percent] of equal or below 25.0 µm, more preferably in the range from 1.5 to 17.5 µm, still more preferably in the range from 2.0 to 15.0 µm.

Additionally or alternatively, the mineral filler (F) has a BET surface area in the range from 1.0 to 50.0 m$^2$/g, more preferably in the range from 5.0 to 40.0 m$^2$/g, still more preferably in the range from 10.0 to 30.0 m$^2$/g.

It is preferred that the mineral filler (F) is present in a specific weight ratio compared to the heterophasic propylene copolymer (HPP) and/or the polypropylene homopolymer (PP-H1) in the polypropylene composition (C).

For example, the weight ratio of heterophasic propylene copolymer (HPP) to the mineral filler (F) [HPP/F] is from 3.0:1.0 to 1.0:1.0. Preferably, the weight ratio of heterophasic propylene copolymer (HPP) to the mineral filler (F) [HPP/F] is from 2.5:1.0 to 1.0:1.0 and more preferably from 2.0:1.0 to 1.0:1.0.

Additionally or alternatively, the weight ratio of polypropylene homopolymer (PP-H1) to the mineral filler (F) [PP-H1/F] is from 1.0:1.0 to 1.0:7.0. Preferably, the weight ratio of polypropylene homopolymer (PP-H1) to the mineral filler (F) [PP-H1/F] is from 1.0:1.0 to 1.0:6.0, and more preferably from 1.0:1.0 to 1.0:5.0.

Additionally or alternatively, the weight ratio of heterophasic propylene copolymer (HPP) and polypropylene homopolymer (PP-H1) to the mineral filler (F) [HPP+PP-H1/F] is below 4.0. Preferably, the weight ratio of heterophasic propylene copolymer (HPP) and polypropylene homopolymer (PP-H1) to the mineral filler (F) [HPP+PP-H1/F] is from 4.0:1.0 to 1.0:1.0 and more preferably from 3.0:1.0 to 2.0:1.0.

Elastomeric Copolymer (E2)

The polymer composition according to the present invention optionally comprises an elastomeric copolymer (E2).

Preferably, the polypropylene composition (C) comprises the elastomeric copolymer (E2) in an amount from 5 to 15 wt.-%, based on the total weight of the composition. For example, the polypropylene composition (C) comprises the elastomeric copolymer (E2) in an amount from 5.0 to 10.0 wt.-%, based on the total weight of the composition.

The elastomeric copolymer (E2) preferably has a melt flow rate MFR$_2$ (190° C.) measured according to ISO 1133 in the range of 0.5 to 30.0 g/10 min, preferably in the range of 0.5 to 20.0 g/10 min and most preferably in the range of 0.5 to 10.0 g/10 min.

The elastomeric copolymer (E2) typically has a density of equal or less than 935 kg/m$^3$, preferably of equal or less than 900 kg/m$^3$, more preferably of equal or less than 880 kg/m$^3$, still more preferably in the range of 850 to 880 kg/m$^3$.

It is preferred that the elastomeric copolymer (E2) is an ethylene copolymer with comonomers selected from $C_3$ to $C_8$ α-olefins. For example, the elastomeric copolymer (E2) comprises especially consists of, monomers copolymerizable with ethylene from the group consisting of propylene, 1-butene, 1-hexene and 1-octene.

More specifically, the elastomeric copolymer (E2) of this invention comprises—apart from ethylene—units derivable from 1-hexene and 1-octene. In a preferred embodiment the elastomeric copolymer (E2) comprises units derivable from ethylene and 1-octene only.

Additionally it is appreciated that the elastomeric copolymer (E2) has preferably a comonomer content in the range from 25.0 to 55.0 wt.-%, more preferably in the range from 30.0 to 50.0 wt.-%, yet more preferably in the range of more than 30.0 to 45.0 wt.-%, based on the total weight of the elastomeric copolymer (E2).

It is appreciated that the elastomeric copolymer (E2) is preferably present in the polypropylene composition (C) in case the weight ratio of heterophasic propylene copolymer (HPP) to the polypropylene homopolymer (PP-H1) [HPP/PP-H1] is from 3.0:1.0 to 1.0:1.0.

For example, the elastomeric copolymer (E2) is present in the polypropylene composition (C) in case the weight ratio of heterophasic propylene copolymer (HPP) to the polypropylene homopolymer (PP-H1) [HPP/PP-H1] is from 2.5:1.0 to 1.5:1.0.

In one embodiment, the elastomeric copolymer (E2) is present in the polypropylene composition (C) in case the weight ratio of heterophasic propylene copolymer (HPP) to the polypropylene homopolymer (PP-H1) [HPP/PP-H1] is about 2.0:1.0.

Additionally or alternatively, the elastomeric copolymer (E2) is present in the polypropylene composition (C) in case the polypropylene composition (C) comprises the heterophasic propylene copolymer (HPP) and the polypropylene homopolymer (PP-H1) in an amount of below 65.0 wt.-%, based on the total weight of the composition.

For example, the elastomeric copolymer (E2) is present in the polypropylene composition (C) in case the polypropylene composition (C) comprises the heterophasic propylene copolymer (HPP) and the polypropylene homopolymer (PP-H1) in an amount of below 62.0 wt.-%, based on the total weight of the composition. Preferably, the elastomeric copolymer (E2) is present in the polypropylene composition (C) in case the polypropylene composition (C) comprises the heterophasic propylene copolymer (HPP) and the polypropylene homopolymer (PP-H1) in an amount ranging from 50.0 to 62.0 wt.-%, based on the total weight of the composition.

Additionally or alternatively, the elastomeric copolymer (E2) is present in the polypropylene composition (C) in case the polypropylene composition (C) comprises the heterophasic propylene copolymer (HPP) in an amount ranging from 30.0 to 50.0 wt.-% and the polypropylene homopolymer (PP-H1) in an amount ranging from 10.0 to 30.0 wt.-%, based on the total weight of the composition.

For example, the elastomeric copolymer (E2) is present in the polypropylene composition (C) in case the polypropylene composition (C) comprises the heterophasic propylene copolymer (HPP) in an amount ranging from 35.0 to 45.0 wt.-% and the polypropylene homopolymer (PP-H1) in an amount ranging from 15.0 to 25.0 wt.-%, based on the total weight of the composition. For example, the elastomeric copolymer (E2) is present in the polypropylene composition (C) in case the polypropylene composition (C) comprises the heterophasic propylene copolymer (HPP) in an amount ranging from 37.0 to 42.0 wt.-% and the polypropylene homopolymer (PP-H1) in an amount ranging from 17.0 to 22.0 wt.-%, based on the total weight of the composition.

As already mentioned above, the elastomeric copolymer (E2) is also dispersed in the matrix, i.e. in the polypropylene matrix (M) of the heterophasic propylene copolymer (HPP).

It is preferred that the elastomeric copolymer (E2) is present in a specific weight ratio compared to the heterophasic propylene copolymer (HPP) and/or the polypropylene homopolymer (PP-H1) and/or the mineral filler (F) in the polypropylene composition (C).

For example, the weight ratio of heterophasic propylene copolymer (HPP) to the elastomeric copolymer (E2) [HPP/E2] is below 8.0. Preferably, the weight ratio of heterophasic propylene copolymer (HPP) to the elastomeric copolymer (E2) [HPP/E2] is from 8.0:1.0 to 1.0:1.0, more preferably from 8.0:1.0 to 2.0:1.0, and most preferably from 8.0:1.0 to 3.0:1.0.

Additionally or alternatively, the weight ratio of polypropylene homopolymer (PP-H1) to the elastomeric copolymer (E2) [PP-H1/E2] is below 4.0. Preferably, the weight ratio of polypropylene homopolymer (PP-H1) to the elastomeric copolymer (E2) [PP-H1/E2] is from 4.0:1.0 to 1.0:1.0, and more preferably from 3.0:1.0 to 1.5:1.0.

Additionally or alternatively, the weight ratio of mineral filler (F) to the elastomeric copolymer (E2) [F/E2] is below 5.0. Preferably, the weight ratio of mineral filler (F) to the elastomeric copolymer (E2) [F/E2] is from 5.0:1.0 to 2.0:1.0, more preferably from 5.0:1.0 to 3.0:1.0.

ARTICLES AND USES ACCORDING TO THE INVENTION

It is appreciated that the instant polypropylene composition (C) is used to reduce paintability failure of a molded article, preferably to reduce paintability failure of an injection molded article. It is especially preferred that the instant polypropylene composition (C) is used to reduce paintability failure of an injection molded article such as an automotive article, i.e. of an exterior or interior automotive article.

Preferably the polypropylene composition (C) is used to keep the paintability failure of the (injection) molded article, like of the (interior or exterior) automotive article, equal or below 15% and preferably equal or below 12%. Accordingly, the polypropylene composition (C) as defined in the instant invention is used to keep the paintability failure of the (injection) molded article, like of the (interior or exterior) automotive article, in the range of 1 to equal or below 15% and more preferably in the range of 1 to equal or below 12%. The measuring method for the paintability failure is provided in the example section. The resistance to pressure-water jetting according to DIN 55662 is one of these tests.

Accordingly, it is to be noted that the molded articles prepared from the polypropylene composition (C) as defined herein shows a good stiffness/impact balance and high paint adhesion. Furthermore, the high paint adhesion is obtained without the use of primers.

In a preferred embodiment the polypropylene composition (C) as defined herein is part of the (injection) molded article, i.e. of the (interior or exterior) automotive article when used for reducing paintability failure. It is especially preferred that the polypropylene composition (C) is part of a composition, which is in turn part of the (injection) molded article, i.e. part of the (interior or exterior) automotive article.

In view of the very good results obtained, the present invention is not only directed to the polypropylene composition (C) as defined herein to reduce paintability failure, but also to an article in which the polypropylene composition (C) is part of it.

Accordingly the present invention is additionally directed to an article, like an automotive article, comprising the polypropylene composition (C), said composition comprises a heterophasic propylene copolymer (HPP), a polypropylene homopolymer (PP-H1), a mineral filler (F) and optionally an elastomeric copolymer (E2), wherein the polypropylene composition (C) comprises (a) 20.0 to 60.0 wt.-%, based on the total weight of the composition, of a heterophasic propylene copolymer (HPP) having a melt flow rate $MFR_2$ (230° C.) measured according to ISO 1133 in the range of 10.0 to 40.0 g/10 min, comprising
   (a1) a polypropylene matrix (M), and
   (a2) an elastomeric propylene copolymer (E1)
(b) 5.0 to 70.0 wt.-%, based on the total weight of the composition, of a polypropylene homopolymer (PP-H1), and
(c) 20.0 to 40.0 wt.-%, based on the total weight of the composition, of a mineral filler (F) being selected from the group consisting of talcum, wollastonite, caolin and mica, wherein the polypropylene composition (C) has a melt flow rate $MFR_2$ (230° C.) measured according to ISO 1133 in the range of 10.0 to 25.0 g/10 min.

The term "automotive article" used in the instant invention indicates that it is a formed three-dimensional article for the interior or exterior of automotives. Typical automotive articles are bumpers, side trims, step assists, body panels, rocker panels, spoilers, dash boards, interior trims and the like. The term "exterior" indicates that the article is not part of the car interior but part of the car's exterior. Accordingly, preferred exterior automotive articles are selected from the group consisting of bumpers, side trims, step assists, body panels, and spoilers. In contrast thereto, the term "interior" indicates that the article is part of the car interior but not part of the car's exterior. Accordingly, preferred interior automotive articles are selected from the group consisting of rocker panels, dash boards and interior trims.

Preferably the automotive article, i.e. the exterior automotive article, comprises equal or more than 80.0 wt.-%, more preferably equal or more than 90.0 wt.-%, yet more preferably equal or more than 95.0 wt.-%, still more preferably equal or more than 99.0 wt.-%, still yet more preferably consists, of the polypropylene composition (C).

Preferably the present polypropylene composition (C) comprises as polymer components only the heterophasic propylene copolymer (HPP), i.e. the polypropylene matrix (M), and the elastomeric propylene copolymer (E1), the polypropylene homopolymer (PP-H1) and the optional elastomeric copolymer (E2). In other words the polypropylene composition (C) may contain further additives and the mineral filler (F) but no other polymer in an amount exceeding 5.0 wt-%, more preferably exceeding 3.0 wt.-%, like exceeding 1.0 wt.-%, based on the total weight of/be polypropylene composition (C). One additional polymer which may be present in such low amounts is a crystalline polyethylene which is a reaction product obtained by the preparation of one of the components used for the manufacture of the instant invention (see in detail above). Thus, is one specific preferred embodiment, the (interior or exterior) automotive article and/or the polypropylene composition (C) contains as polymer components only the heterophasic propylene copolymer (HPP), i.e. the polypropylene matrix (M), and the elastomeric propylene copolymer (E1), the polypropylene homopolymer (PP-H1) and the optional elastomeric copolymer (E2) in amounts as mentioned above.

For mixing the individual components of the instant polypropylene composition (C), a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate the articles, i.e. the (interior or exterior) automotive articles.

The present invention will now be described in further detail by the examples provided below.

EXAMPLES

A. Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Quantification of Comonomer Content by FTIR Spectroscopy

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 cm$^{-1}$. Specifically, the butene or hexene content of a polyethylene copolymer is determined using the baseline corrected peak area of the quantitative bands found at 1377-1379 cm$^{-1}$. Quantitative results are obtained based upon reference to the film thickness.

Density is measured according to ISO 1183-187. Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

Intrinsic viscosity is measured according to DIN ISO 1628/1, October 1999 (in Decalin at 135° C.).

Xylene Cold Soluble Fraction (XCS Wt %)

The xylene cold soluble fraction (XCS) is determined at 23° C. according to ISO 6427.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-1.

Median particle size d50 (Sedimentation) is calculated from the particle size distribution [mass percent] as determined by gravitational liquid sedimentation according to ISO 13317-3 (Sedigraph).

Tensile Modulus; Tensile stress at break; Tensile stress at yield; Tensile strain at yield; Tensile strength; Tensile strain at tensile strength; Tensile strain at break were measured according to ISO 527-2 (cross head speed=50 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179-1/1eA/DIN 53453 at 23° C., −20° C. and −30° C., using injection molded bar test specimens of 80×10×4 mm$^3$ mm$^3$ prepared in accordance with ISO 294-1:1996.

Shrinkage (SH) radial; Shrinkage (SH) tangential were determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° C./min.

Cutoff particle size d95 (Sedimentation) is calculated from the particle size distribution [mass percent] as determined by gravitational liquid sedimentation according to ISO 13317-3 (Sedigraph).

Surface area: BET with N$_2$ gas according to DIN 66131/2, apparatus Micromeritics Tristar 3000: sample preparation at a temperature of 50° C. 6 hours in vacuum.

Paintability Test:

Sample Preparation:

The maximum temperature of the melt was set to 240° C. The following conditions for the injection molding of test panels (80 mm×150 mm×2 mm) were used: melt temperature=240° C., mold temperature=50° C., and flow front velocity 100 mm/s.

The test panels were painted in a usual way with a standard laboratory painting process, which was composed of three consecutive steps (Power wash process, flame pre-treatment and painting process) and performed according Borealis QM work instructions (QMAA 3-430-04, available from Borealis). The panels were first purified in a simulated power wash process (pH 10, 30 bar, 30° C.). After being washed with desalinated water the panels were dried at room temperature.

For activating the panel surface, the burner Hill/Asis Brenner S220 available from Herbert Arnold GmbH, Germany was used. An air/methane ratio of 11 at a volume flowrate of 310:28.2 was adjusted for the flame pretreatment. The panels were pulled ahead on a skid with 800 mm/s and a distance from the flame of 8 cm.

A two layer paint systems consisting of a base coat and a clear coat was applied for painting consisting of a base coat paint and a clear coat.

As base coat paint HBL schwarz II (black waterborne base coat) of BASF SE was used (drying for 10 minutes at 70° C.). As clear coat LMKL Wörwag 108728 R3203H (solvent borne clear coat) of Karl Wörwag Lack- and Farbenfabrik GmbH & Co.KG was used (drying for 45 minutes at 80° C.).

After painting, the test panels were dried for 3 days at 50° C.

Afterwards the painted test panels were scratched with a Cutter 301 (according to DIN EN/ISO 17872:2007) such that a pre-fabricated scratch template was obtained.

Adhesion Test:

For the adhesion characterization, the resistance of the pre-fabricated scratch template to pressure-water jetting according to DIN 55662 (Method C) was tested.

A high pressure water-jet with temperature T was directed for time t at distance d under angle α to the surface of the test panel. Pressure of the water jet results from the water flow rate and is determined by the type of nozzle installed at the end of the water pipe.

The following parameters were used:

T (water)=60° C.; t=60 s; d=130 mm, α=90°, water flow rate 11.3 l/min, nozzle type=MPEG 2506.

For each example 5 panels (size 80 mm×150 mm×2 mm) have been tested. The panels were produced by injection moulding with 240° C. melt temperature and 50° C. mould temperature. The flow front velocity was 100 mm/s.

Figure 1:
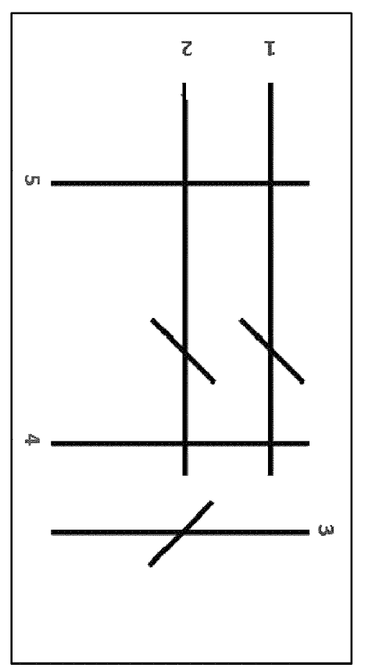
FIG. 1 outlines the test lines used for evaluation of the failed painted areas

On each panel 5 certain points were used to judge the paintability failure in [%] (failures>type 1a/1b/1c are considered) as shown in FIG. 1.

(e.g. 5 panels for each example, produced at a flow front velocity of 100 mm/s, were tested, so there were 25 points in total. If 5 points failed, the failure rate was 20%)

2. Examples

The catalyst used in the polymerization process for the polymer HPP2 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in Table 1.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl)phosphate) phosphite) of BASF AG, Germany were added to the polymers in the same step.

The analytics of the prepared sample can be also gathered from Table 1.

Post Reactor Treatment

The polymer HPP2 was first compounded using a TSE16TC extruder with 0.05 wt.-% calcium stearate and 0.20 wt % Irganox FF and then sent off for base mechanical testing (Table 1).

The polymer powder of HPP2 was then mixed with polypropylene homopolymer (PP-H1), Talc and optionally an elastomeric copolymer (E2) and extruded using a PRISM TSE 24 twin screw extruder with an L/D ratio of 30:1 and two sets of kneading blocks in the screw configuration using a melt temperature profile between 200 and 240° C.

TABLE 1

| Polymerization conditions of heterophasic polypropylene (HPP2) | | |
|---|---|---|
| | | HPP2 |
| TEAL/D | [mol/mol] | 15/1 |
| Loop | | |
| $MFR_2$ | [g/10 min] | 55 |
| $C_2$ total | [wt.-%] | 0 |
| XCS | [wt.-%] | 0 |
| 1. Gas phase | | |
| $MFR_2$ | [g/10 min] | 55 |
| $C_2$ total | [wt.-%] | 0 |
| XCS | [wt.-%] | 0 |
| Split | [wt.-%] | 40 |
| 2. Gas phase | | |
| $C_2/C_3$ ratio | [mol/kmol] | 550 |
| Split | [wt.-%] | 32 |
| Product | | |
| $MFR_2$ | [g/10 min] | 11 |
| XCS | [wt.-%] | 30 |
| IV of AM | [dl/g] | 2.5 |
| $C_2$ of AM | [wt.-%] | 38 |
| $C_2$ total | [wt.-%] | 12.5 |
| Flexural modulus | [MPa] | 1050 |
| Charpy NIS, −20° C. | $kJ/m^2$ | 8.5 |

TABLE 2

Composition and properties of the prepared polypropylene compositions

| | | CE1 | CE2 | CE3 | CE4 | IE1 | IE2 | IE3 | IE4 |
|---|---|---|---|---|---|---|---|---|---|
| HPP1 | wt.-% | | | 62.5 | | | | | |
| HPP2 | wt.-% | | 67 | | 40 | 40 | 50 | 60 | 40 |
| PP-H1 | wt.-% | 67 | | | | 27 | 17 | 7 | 20 |
| PE-H | wt.-% | | | | 7 | | | | |
| Talc | wt.-% | 30 | 30 | 30 | 30 | 30 | 30 | 30 | 30 |
| E2a | wt.-% | | | | | | | | 7 |
| E2b | wt.-% | | | 4 | | | | | |
| MFR$_2$ | g/10 min | 60.2 | 8.0 | 14.0 | 13.6 | 18.6 | 14.5 | 14.5 | 11.2 |
| Tensile Modulus | MPa | 5307 | 2928 | 4103 | 3425 | 3960 | 3540 | 3238 | 3132 |
| Charpy NIS, +23° C. | kJ/m$^2$ | 1.3 | 19.4 | 4.4 | 4.9 | 2.7 | 4.3 | 9.3 | 10.6 |
| Charpy NIS, −20° C. | kJ/m$^2$ | 1.2 | 3.3 | | 1.9 | 1.7 | 2.6 | 2.8 | 2.8 |
| Shrinkage radial | % | 0.97 | 0.67 | | 0.76 | 0.80 | 0.76 | 0.70 | 0.69 |
| Shrinkage tangential | % | 0.82 | 0.57 | | 0.66 | 0.69 | 0.66 | 0.59 | 0.59 |
| CLTE +23/80° C. | (1/K) * E−6 | 46 | 43 | | 45 | 47 | 47 | 44 | 44 |
| CLTE −30/80° C. | (1/K) * E−6 | 36 | 38 | | 39 | 40 | 40 | 38 | 38 |
| Failure rate | % | 4 | 40 | 100 | 32 | 8 | 8 | 8 | 12 |

Remaining part to 100 wt.-% are additives, like antioxidants, nucleating agents, carbon black etc.
HPP1 is the commercial product BF970MO of Borealis AG, which is a heterophasic polypropylene having a melt flow rate MFR$_2$ (230° C.) of 20 g/10 min.
HPP2 is a heterophasic polypropylene, see Table 1 above.
PP-H1 is the commercial product HK060AE of Borealis AG, which is a polypropylene homopolymer having a melt flow rate MFR$_2$ (230° C.) of 125 g/10 min.
Talc is the commercial product Luzenac HAR T84 of Luzenac having a BET of 16 m$^2$/g and an average particle size (d50) of 11.5 μm.
E2a is the commercial product Engage 8150 of Dow Elastomers, which is an ethylene-1-octene copolymer having a density of 0.868 g/cm$^3$ and a melt flow rate MFR$_2$ (190° C.) of 0.5 g/10 min.
E2b is the commercial product Engage 8100 of Dow Elastomers, which is an ethylene-1-octene copolymer having a density of 0.882 g/cm$^3$ and a melt flow rate MFR$_2$ (190° C.) of 1.1 g/10 min.
PE-H is the commercial product MG9641 of Borealis AG, which is a high density polyethylene having a melt flow rate MFR$_2$ (190° C.) of 8 g/10 min.

The inventive materials IE1 to IE4 show a good balance of stiffness/impact. Furthermore, the test lines for the inventive materials IE1 to IE4 show much less failed areas compared to the comparative materials CE1 to CE4. Accordingly, the inventive materials IE1 to IE4 show a good stiffness/impact balance and high paint adhesion. Furthermore, the high paint adhesion is obtained without the use of primers.

What is claimed is:

1. Polypropylene composition (C), the polypropylene composition (C) comprising:
   (a) 30.0 to 60.0 wt.-%, based on the total weight of the composition, of a heterophasic propylene copolymer (HPP) having a melt flow rate MFR$_2$ (230° C.) measured according to ISO 1133 in the range of 10.0 to 40.0 g/10 min, comprising
      (a1) a polypropylene matrix (M), and
      (a2) an elastomeric propylene copolymer (E1)
   (b) 5.0 to 30.0 wt.-%, based on the total weight of the composition, of a polypropylene homopolymer (PP-H1), and
   (c) 25.0 to 35.0 wt.-%, based on the total weight of the composition, of a mineral filler (F) being selected from the group consisting of talcum, wollastonite, caolin and mica,
   wherein the polypropylene composition (C) has a melt flow rate MFR$_2$ (230° C.) measured according to ISO 1133 in the range of 10.0 to 25.0 g/10 min, a tensile modulus in the range from 2800 to 4500 MPa and a Charpy notched impact strength at +23° C. in the range of 4 to 20 kJ/m$^2$.

2. The polypropylene composition (C) according to claim 1, wherein the polypropylene composition (C) has a Coefficient of Linear Thermal Expansion (CLTE) −30/+80° C. of ≤45 μm/mK.

3. The polypropylene composition (C) according to claim 1, wherein the heterophasic propylene copolymer (HPP) has
   (a) a melt flow rate MFR$_2$ (230° C.) measured according to ISO 1133 in the range of 10.0 to 25.0 g/10 min,
   and/or
   (b) an intrinsic viscosity (IV) in the range of 1.8 to 4.0 dl/g, measured as the intrinsic viscosity (IV) of the xylene cold soluble (XCS) fraction of the heterophasic propylene copolymer (HPP),
   and/or
   (c) a comonomer content of 25.0 to 50.0 wt.-%, based on the total weight of the xylene cold soluble fraction of the heterophasic propylene copolymer (HPP), wherein the comonomers preferably are ethylene and/or a C$_4$ to C$_{12}$ olefin.

4. The polypropylene composition (C) according to claim 1, wherein the polypropylene matrix (M) of the heterophasic propylene copolymer (HPP)
   (a) is a propylene homopolymer (PP-H2) or a random propylene copolymer (PP-C) with comonomers selected from ethylene and/or C$_4$ to C$_{12}$ α-olefins,
   and/or
   (b) has a melt flow rate MFR$_2$ (230° C.) measured according to ISO 1133 in the range of 30.0 to 300.0 g/10 min,
   and/or
   (c) has a xylene cold soluble (XCS) content no higher than 5.0 wt.-%.

5. The polypropylene composition (C) according to claim 1, wherein the polypropylene homopolymer (PP-H1) has a melt flow rate MFR$_2$ (230° C.) measured according to ISO 1133 in the range of 70.0 to 150.0 g/10 min.

6. The polypropylene composition (C) according to claim 1, wherein the mineral filler (F) is talc.

7. The polypropylene composition (C) according to claim 1, wherein the polypropylene composition (C) comprises 5.0 to 15.0 wt.-%, based on the total weight of the composition, of an elastomeric copolymer (E2) comprising units derived from ethylene and $C_3$ to $C_8$ α-olefins.

8. The polypropylene composition (C) according to claim 7, wherein the polypropylene composition (C) comprises the heterophasic propylene copolymer (HPP) and the polypropylene homopolymer (PP-H1) in an amount of below 65.0 wt.-%, based on the total weight of the composition.

9. The polypropylene composition (C) according to claim 8, wherein the elastomeric copolymer (E2) has
   (a) a density of equal or less than 935 kg/m$^3$, and/or
   (b) a melt flow rate MFR$_2$ (190° C.) measured according to ISO 1133 in the range of 0.5 to 30.0 g/10 min.

10. The polypropylene composition (C) according to claim 7, wherein
    (a) the weight ratio of heterophasic propylene copolymer (HPP) to the polypropylene homopolymer (PP-H1) [HPP/PP-H1] is from 12.0:1.0 to 1.0:1.0, and/or
    (b) the weight ratio of heterophasic propylene copolymer (HPP) to the mineral filler (F) [HPP/F] is from 3:1 to 1:1, and/or
    (c) the weight ratio of heterophasic propylene copolymer (HPP) and polypropylene homopolymer (PP-H1) to the mineral filler (F) [HPP+PP-H1/F] is below 4.0, and/or
    (d) the weight ratio of heterophasic propylene copolymer (HPP) to the elastomeric copolymer (E2) [HPP/E2] is below 8.0.

11. Article comprising a polypropylene composition (C), the polypropylene composition (C) comprising:
    (a) 30.0 to 60.0 wt.-%, based on the total weight of the composition, of a heterophasic propylene copolymer (HPP) having a melt flow rate MFR$_2$ (230° C.) measured according to ISO 1133 in the range of 10.0 to 40.0 g/10 min, comprising
        (a1) a polypropylene matrix (M), and
        (a2) an elastomeric propylene copolymer (E1)
    (b) 5.0 to 30.0 wt.-%, based on the total weight of the composition, of a polypropylene homopolymer (PP-H1), and
    (c) 25.0 to 35.0 wt.-%, based on the total weight of the composition, of a mineral filler (F) being selected from the group consisting of talcum, wollastonite, caolin and mica,
    wherein the polypropylene composition (C) has a melt flow rate MFR$_2$ (230° C.) measured according to ISO 1133 in the range of 10.0 to 25.0 g/10 min, a tensile modulus in the range from 2800 to 4500 MPa and a Charpy notched impact strength at +23° C. in the range of 4 to 20 kJ/m$^2$.

12. The article according to claim 11, wherein the article is an automotive article.

13. The polypropylene composition (C) according to claim 1, wherein the polypropylene composition (C) keeps paintability failure of a molded article equal or below 15%.

14. The polypropylene composition (C) according to claim 1, wherein the polypropylene composition (C) keeps the paintability failure of automotive articles equal or below 15%.

15. The polypropylene composition (C) according to claim 1, wherein the mineral filler (F) is talc having an average particle size d50 in the range of 0.5 to 20.0 μm.

16. The article according to claim 11, wherein the article is an exterior or interior automotive article selected from the group consisting of bumpers, body panels, rocker panels, side trims, step assists, spoilers and dash boards.

17. The polypropylene composition (C) according to claim 1, wherein the polypropylene composition (C) keeps paintability failure of exterior or interior automotive articles equal or below 15%.

* * * * *